UNITED STATES PATENT OFFICE.

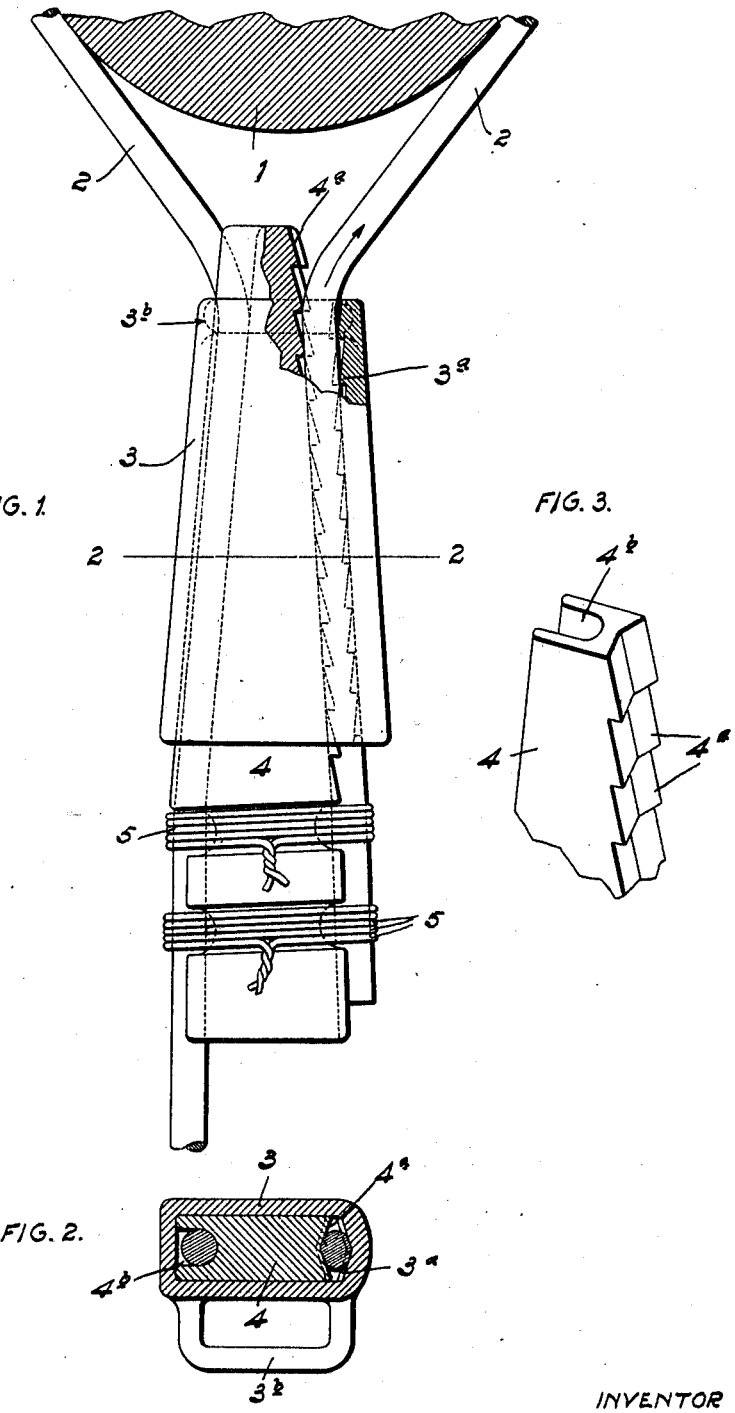

CLAUDE L. MATTHEWS, OF ST. LOUIS, MISSOURI.

ROPE-CLAMP.

988,481.  Specification of Letters Patent.  Patented Apr. 4, 1911.

Application filed January 21, 1910. Serial No. 539,336.

*To all whom it may concern:*

Be it known that I, CLAUDE L. MATTHEWS, a citizen of the United States, residing at St. Louis, Missouri, have invented a certain new and useful Improvement in Rope-Clamps, of which the following is a full, clear, and exact description, such as will enable others skilled in the art to which it appertains to make and use the same, reference being had to the accompanying drawings, forming part of this specification, in which—

Figure 1 is a plan view, partly in section, of my improved rope clamp. Fig. 2 is a sectional view on line 2—2 of Fig. 1. Fig. 3 is a detail view of the inner end of the wedge.

This invention relates to a new and useful improvement in rope clamps designed particularly for use in connection with guy-ropes, commonly employed with telegraph and telephone poles. In practice, where a pole is to be braced, a guy-anchor or a dead man (a timber about four feet long) is buried in the ground at the desired point, and the guy-rope run therethrough to the upper end of the pole to be guyed or braced. The guy-rope is usually a cable composed of twisted strands, whose upper end is formed in a loop around the pole and whose lower end is also formed with a loop around the eye of the guy-anchor.

The object of my present invention is to connect the end of the guy-rope in a clamp and pass said rope around the pole or through the eye, and then freely through the opposite side of the clamp, so that the stretch in the rope may be taken up.

In the drawings, 1 indicates a portion of the pole, or a part around or through which the loop is arranged.

2 is the cable or guy-rope, which is threaded through a sleeve 3, then around the pole or through the eye, as the case may be, the end of said cable being threaded in opposite direction through said sleeve 3. The free end of the cable is arranged adjacent teeth 3ª in the sleeve. The wall of the sleeve opposite the sleeve 3ª is preferably flat, as shown in Fig. 2.

4 is a wedge having teeth 4ª in one side, said teeth being V-shaped, as are preferably the teeth 3ª, and when the wedge 4 is driven into the sleeve, these teeth grip the free end of the cable between them. The teeth are so disposed as to prevent the withdrawal of the free end of the cable from the clamp in the direction of the strain which is imposed upon said free end of the direction of the arrow. On the contrary, the strain of the cable in the direction of the arrow tends to tighten the clamp and cause its teeth and the teeth 3ª to more firmly bite into said free end. The opposite side of the wedge 4 is provided with a deep groove 4ᵇ, through which the cable 2 freely passes. Thus, in applying the guy-rope in position, when the free end is secured in the clamp, the clamp is free to move on the guy-rope in taking up slack and tightening the same. In order to assist in this action, the sleeve 3 is preferably provided with a loop 3ᵇ at its inner end, which may be struck by a hammer in driving the sleeve along the guy-rope to take up slack, or a hook on a block and tackle may be attached in the opening of said loop and the sleeve drawn up tight. After the wedge 4 is driven home and all the slack in the guy-rope is taken up, the free end of the cable, as well as the main portion thereof, may be secured to an extension of the wedge 4 by means of wire 5 wrapped around said parts, as shown in Fig. 1. The wedge extension is preferably recessed or cut away to receive the wire 5.

I claim:

1. A rope clamp comprising a sleeve and a wedge, said parts being constructed to clamp a rope on one side of said wedge and to permit the rope to pass freely on the other side of said wedge, and an extension on said wedge to which one or both of said ropes may be secured.

2. A rope clamp comprising a sleeve and a wedge, said wedge being designed to engage a rope on one side to clamp the same in position, and being provided with a deep groove on the other side, through which the rope freely passes.

3. A rope clamp comprising a sleeve and a wedge for clamping the free end of the rope in position and permitting the length of said rope to pass freely through said clamp, and means for securing the two portions of said rope to said wedge.

4. A rope clamp comprising a sleeve and a wedge, said sleeve having teeth on one side and a flat wall on the opposite side, and said wedge having teeth to coöperate with a rope or cable in conjunction with the teeth in said sleeve, the opposite side of said wedge bearing against said flat face and being provided with a deep groove through which the rope may freely pass.

In testimony whereof I hereunto affix my signature in the presence of two witnesses, this 19th day of January, 1910.

CLAUDE L. MATTHEWS.

Witnesses:
F. R. CORNWALL,
M. P. SMITH.

Copies of this patent may be obtained for five cents each, by addressing the "Commissioner of Patents, Washington, D. C."